(12) United States Patent
Upadhyaya et al.

(10) Patent No.: US 11,772,079 B2
(45) Date of Patent: Oct. 3, 2023

(54) DIESEL PARTICULATE FILTRATION (DPF) SYSTEM

(71) Applicant: South Bank University Enterprises Ltd., London (GB)

(72) Inventors: Hari Upadhyaya, London (GB); Ali Salimian, London (GB); Arjang Aminishahsavarani, London (GB)

(73) Assignee: South Bank University Enterprises Ltd., London (GB)

( * ) Notice: Subject to any disclaimer, the term of this patent is extended or adjusted under 35 U.S.C. 154(b) by 262 days.

(21) Appl. No.: 17/064,929

(22) Filed: Oct. 7, 2020

(65) Prior Publication Data

US 2021/0106981 A1 Apr. 15, 2021
US 2021/0370275 A9 Dec. 2, 2021

Related U.S. Application Data

(60) Provisional application No. 62/912,477, filed on Oct. 8, 2019.

(51) Int. Cl.
*F01N 3/022* (2006.01)
*B01J 23/83* (2006.01)
(Continued)

(52) U.S. Cl.
CPC .......... *B01J 23/83* (2013.01); *B01D 39/2068* (2013.01); *B01D 46/0001* (2013.01);
(Continued)

(58) Field of Classification Search
CPC ........ B01D 2239/10; B01D 2255/2065; B01D 2255/915; B01D 2258/012; B01D 2273/22; B01D 2279/30; B01D 39/2068; B01D 46/0001; B01D 46/16; B01D 46/4245; B01D 46/60; B01D 46/82; B01D 46/84; B01D 53/944; B01J 23/10; B01J 23/83;
(Continued)

(56) References Cited

U.S. PATENT DOCUMENTS 4,283,207 A 8/1981 Martyniuk
5,423,904 A 6/1995 Dasgupta
(Continued)

FOREIGN PATENT DOCUMENTS

CN 208564721 U 3/2019
EP 0154145 A2 9/1985
(Continued)

OTHER PUBLICATIONS

GB Examination Report for Application No. GB2116690.5 dated Jan. 7, 2022, 2 pages.
(Continued)

*Primary Examiner* — Carl C Staubach
*Assistant Examiner* — Diem T Tran
(74) *Attorney, Agent, or Firm* — FINCH & MALONEY PLLC (57) ABSTRACT

A Diesel Particulate Filter (DPF) assembly configured to be incorporated in the exhaust gas stream, the DPF assembly comprising: Quartz/Composite ceramic mixture disposed as filter elements, mechanical support components and optional electrical soot removal solutions including electrical, di-electrical and microwave solutions.

18 Claims, 9 Drawing Sheets

(51) Int. Cl.
  *B01D 39/20* (2006.01)
  *B01D 46/00* (2022.01)
  *B01D 46/16* (2006.01)
  *B01D 46/42* (2006.01)
  *B01J 23/10* (2006.01)
  *B01J 35/04* (2006.01)
  *B01J 37/00* (2006.01)
  *B01J 37/02* (2006.01)
  *B01J 37/08* (2006.01)
  *B01D 46/60* (2022.01)
  *B01D 46/82* (2022.01)
  *B01D 46/84* (2022.01)
  *F01N 3/021* (2006.01)
  *F01N 3/027* (2006.01)
  *F01N 13/16* (2010.01)

(52) U.S. Cl.
  CPC ......... *B01D 46/16* (2013.01); *B01D 46/4245* (2013.01); *B01D 46/60* (2022.01); *B01D 46/82* (2022.01); *B01D 46/84* (2022.01); *B01J 23/10* (2013.01); *B01J 35/04* (2013.01); *B01J 37/0036* (2013.01); *B01J 37/0215* (2013.01); *B01J 37/08* (2013.01); *F01N 3/022* (2013.01); *F01N 3/027* (2013.01); *F01N 3/0215* (2013.01); *F01N 13/16* (2013.01); *B01D 2239/10* (2013.01); *B01D 2273/22* (2013.01); *B01D 2279/30* (2013.01); *F01N 2330/06* (2013.01)

(58) Field of Classification Search
  CPC .... B01J 35/04; B01J 37/0036; B01J 37/0215; B01J 37/08; F01N 13/08; F01N 13/16; F01N 2330/06; F01N 2590/11; F01N 3/0215; F01N 3/022; F01N 3/027; F01N 3/028
  See application file for complete search history.

(56) References Cited

U.S. PATENT DOCUMENTS

| | | | |
|---|---|---|---|
| 5,453,116 A | * | 9/1995 | Fischer .................. F01N 3/0212 95/278 |
| 7,171,801 B2 | | 2/2007 | Verkiel et al. |
| 8,236,084 B2 | | 8/2012 | Fischer et al. |
| 8,298,311 B2 | | 10/2012 | Chen et al. |
| 2015/0240681 A1 | | 8/2015 | Fritz et al. |

FOREIGN PATENT DOCUMENTS

| | | |
|---|---|---|
| EP | 0682174 A2 | 5/1995 |
| JP | 2002138815 A | 5/2002 |
| WO | 2008157487 A2 | 12/2008 |
| WO | 2014030785 A1 | 2/2014 |

OTHER PUBLICATIONS

UK Patent Application No. 2116690.5 Specification as filed on Nov. 19, 2021, 11 pages.
PCT International Search Report for Application No. PCT/IB2020/059421 dated Dec. 17, 2020, 12 pages.

* cited by examiner

DIESEL PARTICULATE FILTRATION (DPF) SYSTEM

CROSS-REFERENCE TO RELATED APPLICATIONS

This application claims priority to U.S. Provisional patent application Ser. No. 62/912,477 titled "Diesel Particulate filtration (DPF) system", filed on Oct. 8, 2019 the disclosure of which is herein incorporated by reference in its entirety.

PATENTS CITED

The following documents and references are incorporated by reference in their entirety, Fritz et al (U.S. Pat. Pub. No. 2015/0240681), Sugano (JP2000000339079), Martyniuk (U.S. Pat. No. 4,283,207), Kawamura et al (EP 0682174), Chen et al (U.S. Pat. No. 8,298,311), Fischer et al (U.S. Pat. No. 8,236,084) and Verkiel et al (U.S. Pat. No. 7,271,801).

FIELD OF THE INVENTION

The present invention relates to systems and methods for filtering exhaust gas particulates, and more particularly to filtering particles upwards from 5 nanometers structures comprised of composite mixtures including silicon dioxide, aluminum oxide, boron trioxide and/or sodium oxide forming porous walls that when exposed to exhaust gases trap harmful elements and then are optionally disposed of via electrical or electromagnetic means.

DESCRIPTION OF THE RELATED ART

Driven by the needs of environmental emission reduction regulations imposed by Euro-VI, and other jurisdictions, Diesel Particulate Filtration (DPF) devices, systems and methods are currently essential for all Diesel vehicles in Europe and other advanced nations. Particulate emissions in exhaust gases from engines, and particularly from diesel internal combustion engines, are handled by wall flow honeycombs with low thermal expansion materials.

However, the above suffer from the disadvantages of high cost of production and maintenance, as well as occasional plugs on the filter material caused by continued operation at low temperatures. With the transition to hybrids (and designed somewhat lower operating temperatures). Previous attempts, like U.S. Pat. No. 4,283,207, disclose a diesel engine exhaust particle filter-incinerator in which conical filter elements are arranged between an inlet and an outlet. Particulates accumulating on the filter surfaces are periodically incinerated by a high voltage applied to electrodes at the edges of the filter surfaces. As is quickly evident, such an attempt can be particularly complicated.

There is a need for improved DPF devices, systems and methods in order to make diesel engines market competitive over the coming years.

SUMMARY OF THE INVENTION

This section is for the purpose of summarizing some aspects of the present invention and to briefly introduce some embodiments. Simplifications or omissions may be made to avoid obscuring the purpose of the section. Such simplifications or omissions are not intended to limit the scope of the present invention.

All references, including any patents or patent applications cited in this specification are hereby incorporated by reference. No admission is made that any reference constitutes prior art. The discussion of the references states what their authors assert, and the applicants reserve the right to challenge the accuracy and pertinence of the cited documents. It will be clearly understood that, although a number of prior art publications are referred to herein, this reference does not constitute an admission that any of these documents form part of the common general knowledge in the art.

It is acknowledged that the term 'comprise' may, under varying jurisdictions, be attributed with either an exclusive or an inclusive meaning. For the purpose of this specification, and unless otherwise noted, the term 'comprise' shall have an inclusive meaning—i.e., that it will be taken to mean an inclusion of not only the listed components it directly references, but also other non-specified components or elements. This rationale will also be used when the term 'comprised' or 'comprising' is used in relation to one or more steps in a method or process.

In one aspect, the invention is about a Diesel Particulate Filter (DPF) assembly configured to be incorporated into the exhaust gas stream of a diesel engine, said DPF assembly comprising one or more pneumatically porous ceramic filter panels, support mechanical components attached to said one or more panels so as to form a filter core; and a DPF assembly comprised of one or more housing mechanical components that create one or more upstream cavities and a downstream cavity pneumatically connected by said one or more porous ceramic filter panels. In another aspect, one or more of said filter panels has a mechanical support component capable of establishing a voltage differential across said filter panel, said voltage differential being large enough to burn off a portion of the soot capture within said panel. In yet another aspect, one or more of said filter panels are formed from a filter mix, wherein said filter mix is comprised of the following percentage (by weight) ranges, with the total being 100%, 55% to 65% mineral fibers and 35% to 45% composite powder with said mineral fibers comprised or one or more of, Quartz, Alumina, wherein said composite powder is comprised of the following percentage (by weight) ranges, with the total being 100%, 70% to 80% Silicon Oxide ($SiO_2$), 4% to 6% Aluminum Oxide ($Al_2O_3$), 14% to 18% Diboron Trioxide ($B_2O_3$) and 2% to 4% Sodium Super Oxide ($NaO_2$) and said filter mix is comprised of the following percentage (by weight) ranges, with the total being 100%: 55% to 65% mineral fibers and 35% to 45% composite powder.

In another aspect, one or more said filter panels has had an electrically conducive electrode applied to all or part of the upstream and downstream filter fascia surface. In yet another aspect, said electrically conductive electrode is comprised of one or more of: wires laid across or metal film deposited across said filter fascia surface, said composite powder is comprised of the following percentage (by weight), 75% Silicon Oxide ($SiO_2$), 5% Aluminum Oxide ($Al_2O_3$), 16% Diboron Trioxide ($B_2O_3$) and 3% Sodium Super Oxide ($NaO_2$) and said filter mix is comprised of the following percentage (by weight): 60% mineral fibers and 40% composite powder. In another aspect, one or more of said panels have been treated with Ceria (Cerium Dioxide $CeO_2$). In yet another aspect, one or more of said filter panels has a mechanical support component capable of establishing a voltage differential across said filter panel upstream fascia, said voltage differential being large enough to burn off a portion of the soot capture within said panel.

In another aspect, one or more of said filter panels are formed from a filter mix, wherein said filter mix is comprised of the following percentage (by weight) ranges, with the total being 100%, 55% to 65% mineral fibers and 35% to 45% composite powder, with said mineral fibers comprised or one or more of: Quartz, Alumina, wherein said composite powder is comprised of the following percentage (by weight) ranges, with the total being 100%, 70% to 80% Silicon Oxide ($SiO_2$), 4% to 6% Aluminum Oxide ($Al_2O_3$), 14% to 18% Diboron Trioxide ($B_2O_3$) and 2% to 4% Sodium Super Oxide ($NaO_2$) and said filter mix is comprised of the following percentage (by weight) ranges, with the total being 100%, 55% to 65% mineral fibers and 35% to 45% composite powder. In yet another aspect, one or more said filter panels has had an electrically conducive electrode applied to all or part of the upstream and downstream filter fascia surface. In yet another aspect, said electrically conductive electrode is comprised of one or more of: wires laid across or metal film deposited across said filter fascia surface, said composite powder is comprised of the following percentage (by weight), 75% Silicon Oxide ($SiO_2$), 5% Aluminum Oxide ($Al_2O_3$), 16% Diboron Trioxide ($B_2O_3$) and 3% Sodium Super Oxide ($NaO_2$) and said filter mix is comprised of the following percentage (by weight): 60% mineral fibers and 40% composite powder.

In another aspect one or more of said panels have been treated with Ceria (Cerium Dioxide $CeO_2$). In yet another aspect, said filter panels are enclosed within a chamber capable of accepting microwave energy, said energy being significantly large enough to burn off a portion of the soot capture within one or more of said panels. In yet another aspect, one or more of said filter panels are formed from a filter mix, wherein said filter mix is comprised of the following percentage (by weight) ranges, with the total being 100%, 55% to 65% mineral fibers and 35% to 45% composite powder, with said mineral fibers comprised or one or more of: Quartz, Alumina, wherein said composite powder is comprised of the following percentage (by weight) ranges, with the total being 100%, 70% to 80% Silicon Oxide ($SiO_2$), 4% to 6% Aluminum Oxide ($Al_2O_3$), 14% to 18% Diboron Trioxide ($B_2O_3$) and 2% to 4% Sodium Super Oxide ($NaO_2$) and said filter mix is comprised of the following percentage (by weight) ranges, with the total being 100%, 55% to 65% mineral fibers and 35% to 45% composite powder.

In another aspect, said composite powder is comprised of the following percentage (by weight), 75% Silicon Oxide ($SiO_2$), 5% Aluminum Oxide ($Al_2O_3$), 16% Diboron Trioxide ($B_2O_3$) and 3% Sodium Super Oxide ($NaO_2$) and said filter mix is comprised of the following percentage (by weight): 60% mineral fibers and 40% composite powder. In yet another aspect, one or more of said panels have been treated with Ceria (Cerium Dioxide $CeO_2$). In one aspect, the invention is about a method for creating filter panels for a Diesel Particulate Filter (DPF) assembly, said method comprising: crushing mineral fibers, creating a composite powder comprised of Silicon Oxide ($SiO_2$), Aluminum Oxide ($Al_2O_3$), Diboron Trioxide ($B_2O_3$) and Sodium Super Oxide ($NaO_2$), creating a filter mix by mixing said mineral fibers with a said composite powder, placing said mixture in a mold and sintering said mixture for at least 30 minutes at a temperature of at least 1200° C., gradually lowering the mixture temperature to 700° C. during at least 10 minutes, and allowing the molded product to cool to ambient temperature. In another aspect, said mineral fibers are comprised or one or more of: Quartz, Alumina.

In another aspect, said composite powder is comprised of the following percentage (by weight) ranges, with the total being 100%: 70% to 80% Silicon Oxide ($SiO_2$), 4% to 6% Aluminum Oxide ($Al_2O_3$), 14% to 18% Diboron Trioxide ($B_2O_3$) and 2% to 4% Sodium Super Oxide ($NaO_2$), and said filter mix is comprised of the following percentage (by weight) ranges, with the total being 100%: 55% to 65% mineral fibers and 35% to 45% composite powder. In yet another aspect, said composite powder is comprised of the following percentage (by weight), 75% Silicon Oxide ($SiO_2$), 5% Aluminum Oxide ($Al_2O_3$), 16% Diboron Trioxide ($B_2O_3$) and 3% Sodium Super Oxide ($NaO_2$), and said filter mix is comprised of the following percentage (by weight): 60% mineral fibers and 40% composite powder. In yet another aspect, said filter panel is removed from said mold and immersed in a Ceria (Cerium Dioxide $CeO_2$) solution for at least 10 minutes and said ceria treated panel is sintered at a low temperature for at least 10 minutes.

In another aspect, one or more fascia of said filter panel have a nickel film deposited on their entire surface. In yet another aspect, said filter panel is removed from said mold and immersed in a Ceria (Cerium Dioxide $CeO_2$) solution for at least 10 minutes; and said ceria treated panel is sintered at a low temperature for at least 10 minutes. In another aspect, one or more fascia of said filter panel have a nickel film deposited on their entire surface. In yet another aspect, said composite powder is comprised of the following percentage (by weight), 75% Silicon Oxide ($SiO_2$), 5% Aluminum Oxide ($Al_2O_3$), 16% Diboron Trioxide ($B_2O_3$) and 3% Sodium Super Oxide ($NaO_2$) and said filter mix is comprised of the following percentage (by weight): 60% mineral fibers and 40% composite powder.

Other features and advantages of the present invention will become apparent upon examining the following detailed description of an embodiment thereof, taken in conjunction with the attached drawings.

The above-described and other features will be appreciated and understood by those skilled in the art from the following detailed description, drawings, and appended claims.

DETAILED DESCRIPTION OF THE INVENTION

This section is for the purpose of summarizing some aspects of the present invention and to briefly introduce some embodiments. Simplifications or omissions may be made to avoid obscuring the purpose of the section. Such simplifications or omissions are not intended to limit the scope of the present invention.

To provide an overall understanding of the invention, certain illustrative embodiments and examples will now be described. However, it will be understood by one of ordinary skill in the art that the same or equivalent functions and sequences may be accomplished by different embodiments that are also intended to be encompassed within the spirit and scope of the disclosure. The compositions, apparatuses, systems and/or methods described herein may be adapted and modified as is appropriate for the application being addressed and that those described herein may be employed in other suitable applications, and that such other additions and modifications will not depart from the scope hereof.

Simplifications or omissions may be made to avoid obscuring the purpose of the section. Such simplifications or omissions are not intended to limit the scope of the present invention. All references, including any patents or patent applications cited in this specification are hereby incorporated by reference. No admission is made that any reference constitutes prior art. The discussion of the references states what their authors assert, and the applicants reserve the right to challenge the accuracy and pertinence of the cited documents. It will be clearly understood that, although a number of prior art publications are referred to herein, this reference does not constitute an admission that any of these documents form part of the common general knowledge in the art.

As used in the specification and claims, the singular forms "a", "an" and "the" include plural references unless the context clearly dictates otherwise. For example, the term "a transaction" may include a plurality of transaction unless the context clearly dictates otherwise. As used in the specification and claims, singular names or types referenced include variations within the family of said name unless the context clearly dictates otherwise.

Certain terminology is used in the following description for convenience only and is not limiting. The words "lower," "upper," "bottom," "top," "front," "back," "left," "right" and "sides" designate directions in the drawings to which reference is made, but are not limiting with respect to the orientation in which the modules or any assembly of them may be used.

It is acknowledged that the term 'comprise' may, under varying jurisdictions, be attributed with either an exclusive or an inclusive meaning. For the purpose of this specification, and unless otherwise noted, the term 'comprise' shall have an inclusive meaning—i.e. that it will be taken to mean an inclusion of not only the listed components it directly references, but also other non-specified components or elements. This rationale will also be used when the term 'comprised' or 'comprising' is used in relation to one or more steps in a method or process.

A Diesel Particulate Filter (DPF) is normally placed within the exhaust stream coming out of the internal combustion diesel engine, in a position which maximizes the amount of filter material surface to which the exhaust stream is exposed, so as to efficiently capture the particulates.

In one embodiment (FIGS. 1-2), the particle filter 100 is comprised an inlet cap 102 with an inlet aperture 104 for receiving exhaust gases from an engine, in particular a diesel engine. A cylindrical outside shell or casing 108 mechanically supports an inlet filter unit 106 of annular or cone shape. The cap 102 support 116 comprises one or more structural frame members interconnecting the casing 108 and the filter 106, in one embodiment, the curved surface of the filter 106 cone 110 extends and connects into the cap 102.

Figure 1:
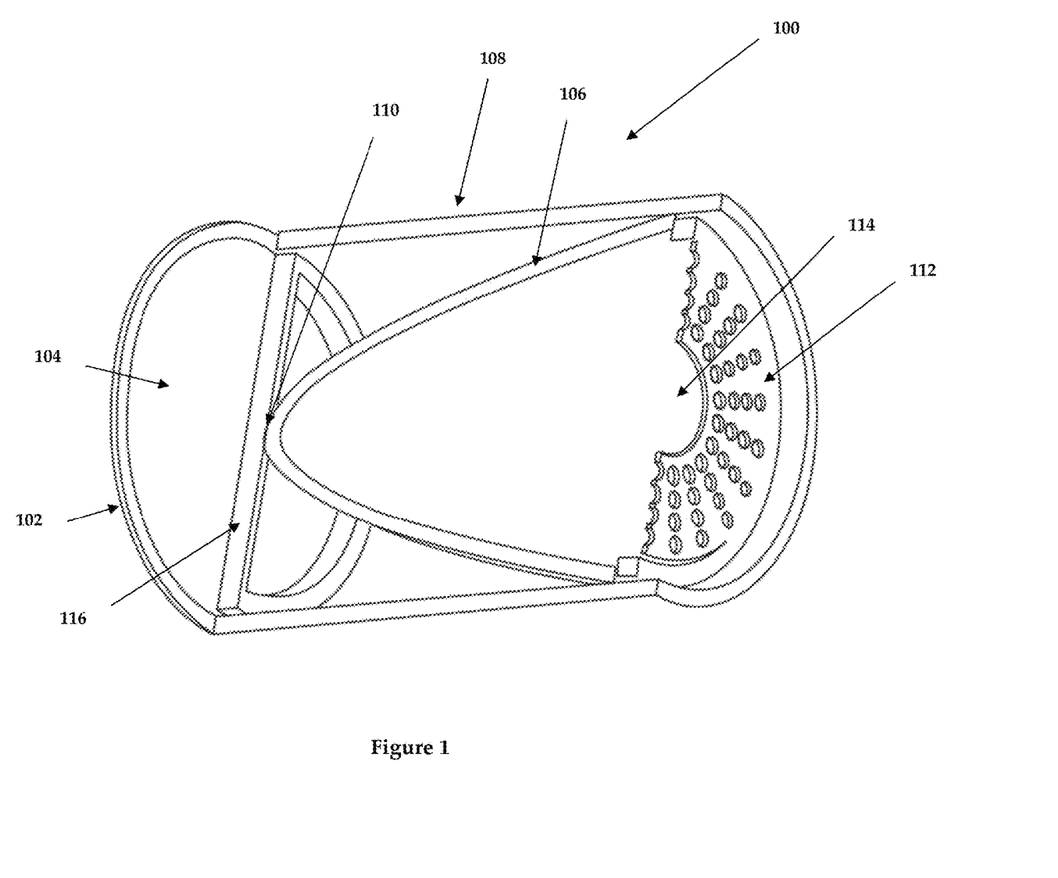
FIG. 1 is a perspective view of a cutaway showing the proposed configuration of a Diesel Particulate Filter (DPF), according to an exemplary embodiment of the invention.
Figure 2:
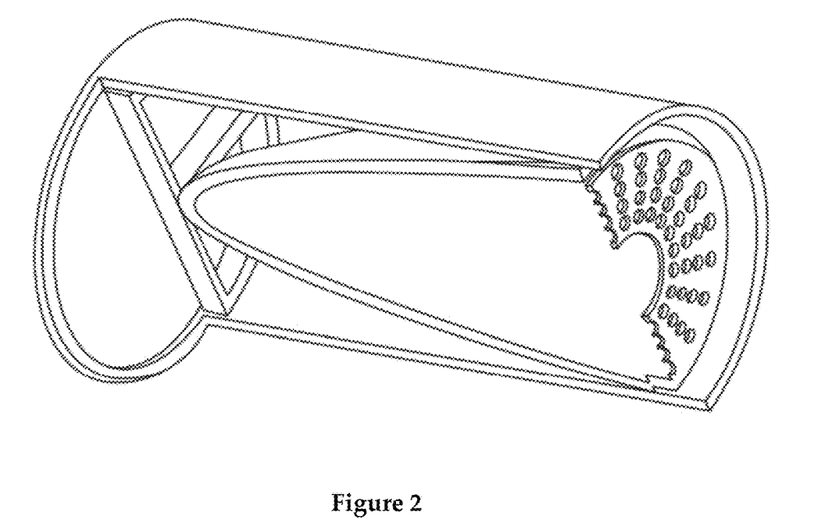
FIG. 2 is another perspective view of a cutaway showing the proposed configuration of a Diesel Particulate Filter (DPF), according to an exemplary embodiment of the invention.

The filter 106 plates are made of a pneumatically porous composite material (discussed further below), which capture the soot and other such particulates along the conical surface of the filter 106. At the end of the filter unit 106 opposite cap 102 there is provided an outlet filter unit support 112. Said outlet support 112 has one or more outlet apertures 114 for connection to an exhaust passage to the atmosphere, possibly via other pollution-removing components. The bottom of the filter 106 is pneumatically sealed to the casing 108 forcing the air to go through the filter 106 material on its way to the exhaust.

The entire filter unit is located in a generally cylindrical casing 108 which extends between cap 102 and support 112. Note the shape need not be 'just' cylindrical, as long as the clearance between In one embodiment, the casing is sealed to cap and support so that a gas-tight passage is provided there between Cap 102, cone 106, casing 108 and support 116 are of materials that may be a combination of metal and ceramic or other electronically non-conductive materials. The supports 116 hold cone 106 plates spaced from the casing 108.

In one embodiment, during use, exhaust gases passing through the filter 100 enter at the aperture 104 are pneumatically directed around the cone shaped filtering component 106. The gases then pass radially inwardly through the filter material, with the filtered gases then going into the central passageway and thence exit outwards through the back-support plate aperture. As exhaust gases pass through the unit, carbon in the form of soot particles accumulate on the upstream fascia of the cone 106.

Figure 5:
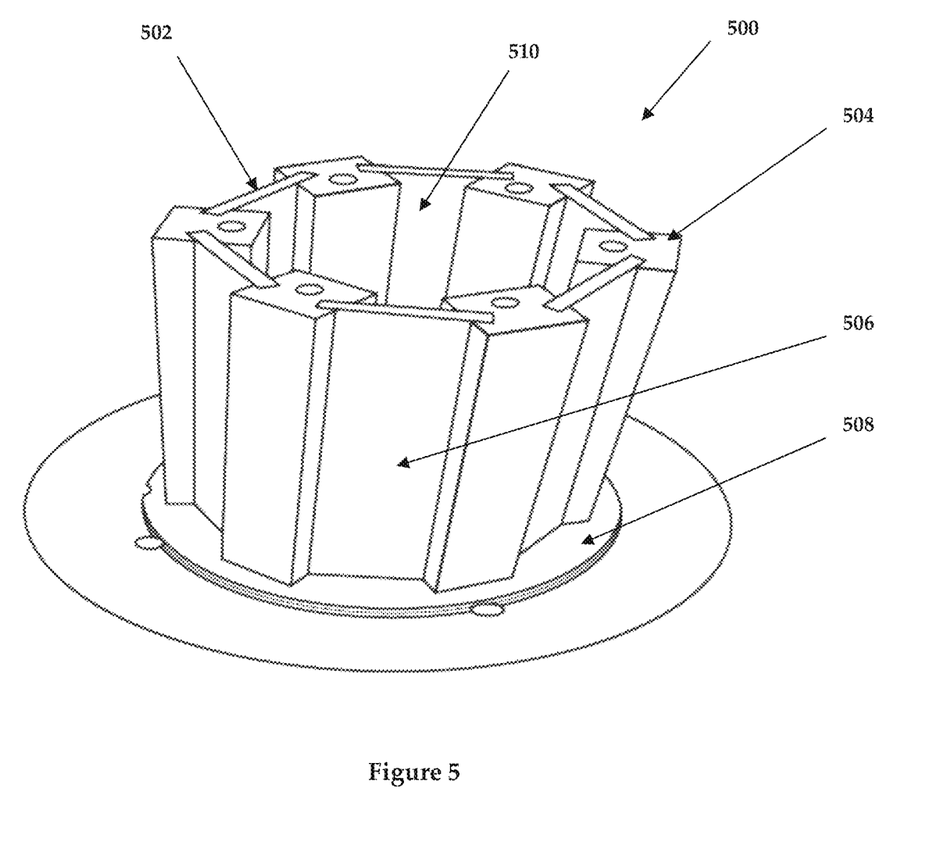
FIG. 5 is a perspective view of a DPF assembled from filter wafers within the metallic support, according to an exemplary embodiment of the invention.

In one embodiment, the filter plates 502 or other suitable shaped (e.g. cone 106) filtering material is formed from a filter mix comprised of a mixture of mineral fibers and a composite powder mix. The mineral fiber mix is comprised of all or parts of quartz, alumina or other suitable similar structural materials. When using quartz, the quartz is comprised of crushed quartz fibers that are crushed by spinning at 30,000 rpm.

The composite powder mix is comprised of a mixture Silicon Oxide ($SiO_2$), Aluminum Oxide ($Al_2O_3$), Diboron Trioxide ($B_2O_3$) and Sodium Super Oxide ($NaO_2$) plus other suitable similar materials. While variation of up to 20% per material per weight appear to be suitable, in one embodiment, the composite powder mix is comprised of a mixture (by weight) of about seventy-five percent (75%) of Silicon Oxide ($SiO_2$), Six percent (6%) of Aluminum Oxide ($Al_2O_3$), Sixteen percent (16%) of Diboron Trioxide ($B_2O_3$) and three percent (3%) of Sodium Super Oxide ($NaO_2$).

The overall filter is then shaped from a filter mix material mix comprised of (by weight) 60% mineral fiber mix and 40% of a composite powder, with a 20% variation possible with similar results.

The resultant pneumatically porous material may be shaped/formed into plates, squares or other suitable shapes. The shown cone shape 106, is but one possible shape, including other embodiments (plates, portions of a circle, etc., which will be shown below) all using the same filtering material.

The mixture is then placed inside a crucible or a high temperature mold defining the desired filter shape. The assembly is then placed inside a furnace and sintered at a temperature of 1200-1250° C. for about forty minutes. The temperature of the furnace is then gradually lowered over a period of about twenty minutes to a temperature of 700° C. and the assembly is then taken out of the furnace and the plate is demolded.

The resulting material is pneumatically porous, and its porosity value is determined by controlling the mass per volume ratio of the quartz/powder mixture when it is molded. An electron microscope image of the filter material (FIGS. 3-4) shows pores 302 extending through the structure 304. These are due to the advantageous use of the crushed quartz fiber pieces in the original mixture which form an internal scaffold or framework for the composite material.

In one embodiment, the surface of the one or more filter plates 502 or cones 106 is further treated by immersion in a solution of Ceria (Cerium Dioxide $CeO_2$) and a solvent, so that the Ceria may be absorbed and lines the pores 302 within the plate 502 material. Ceria serves as a catalyst for the combustion of the soot particles. In one embodiment, the solution with the Ceria is a 50:50 mixture of Ethanol and Water. While ethanol was used, any other suitable organic solvents (e.g. Methanol, Hexane, etc.) may be used. Immersion for 10 or more minutes is enough, with an hour preferred, to attach the Ceria to the pores of the filter.

Figure 3:
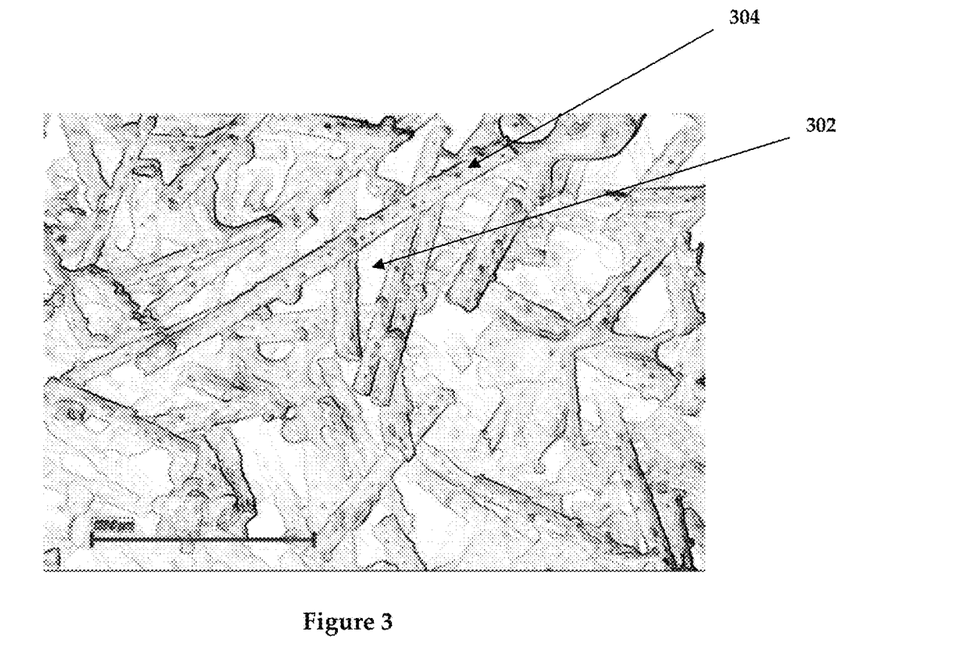
FIGS. 3-4 show scanning electron microscope images of the proposed mineral based filtering material, according to an exemplary embodiment of the invention.
Figure 4:
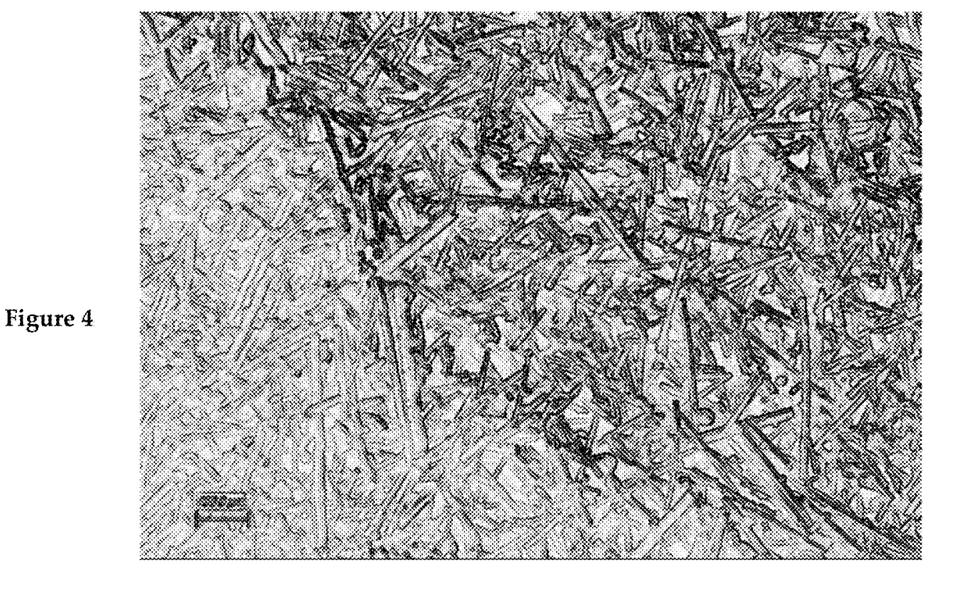

The immersion is followed by low-temperature sintering at between 400-700 deg C., which stabilizes the Ceria. By stabilizing the Ceria within the network of internal surfaces of the pores 302 of the plate material, the Ceria is well-adapted to efficiently interact with the soot particles.

The incorporation of Ceria as a catalyst material for the combustion process has the advantage of allowing operation of the filter unit at a lower temperature than a unit with the composite material alone. By stabilizing the Ceria on the internal pore surfaces of the composite material, it can efficiently interact with the soot particles without suffering any degradation by the flow of exhaust gases. The Ceria material produces an improved discharge path through the plates and hence, facilitates the discharge assisted regeneration within the filter. Ceria has the advantages of performance efficiency, ease of application, thermal stability and being unaffected by the sulfur content of the exhaust gases. In an alternate embodiment, platinum may be used instead of Ceria.

The above described material (whether treated with Ceria or not) in operation will capture the soot particles within the pores 302 and burn the soot when a sufficient temperature is reached by the filter plate/cone 106. It is relatively simple to modify the above filter for use with a wide range of engines. As one example, for a typical 320 cc diesel engine, the filter of FIGS. 1-2 has a length of 10 cm and a diameter of 4 cm. These dimensions can be changed for engines of different sizes. The porosity of the filter and in particular of the plates can be controlled by adjusting the mass per volume ratio of the mixture which is molded to form the plates/cone of the filter.

The above-described arrangement has numerous advantages. It permits the continuous filtration and combustion of soot particles independently of the engine's operating conduction. It minimizes the fuel consumption associated with the active regeneration process. It is simple and cheap to manufacture. It permits the elimination of platinum catalyst loading and has a good adaptability to diesel fuel with a high sulfur content.

The porous material used for the plates permits a good flow through of exhaust gases together with providing an effective substrate for the capture of soot. It has the advantage that its porosity is adjustable. Parameters which can be controlled to affect this are composition of the ceramic, fiber size distribution, ceramic to fiber ratio, heating profile (temperature, time, heat up and cool down rates), and the fibers mass per volume in the mixture. Furthermore, the material can withstand the corrosive environment and is stable up to 1250° C. It can be molded into various shapes.

In one embodiment, in operation, the unit core 500 (FIGS. 5-7) may be configured as a series of filter plates 502 formed into thin slats that are held by one or more columns 504. The columns 504 may be metal (both ferrous and non-ferrous), carbon composite or any other suitable structural material mounted on a support base 508.

Figure 6:
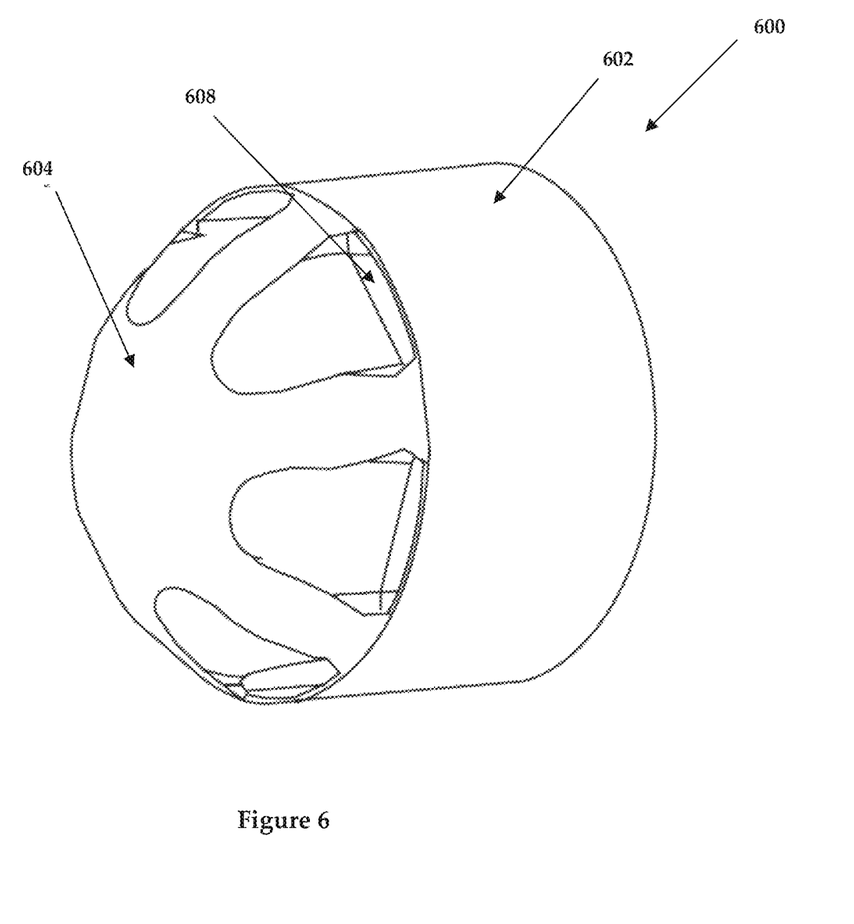
FIG. 6 is a front perspective view of the shroud with internal channel showing the proposed configuration of a DPF, according to an exemplary embodiment of the invention.
Figure 7:
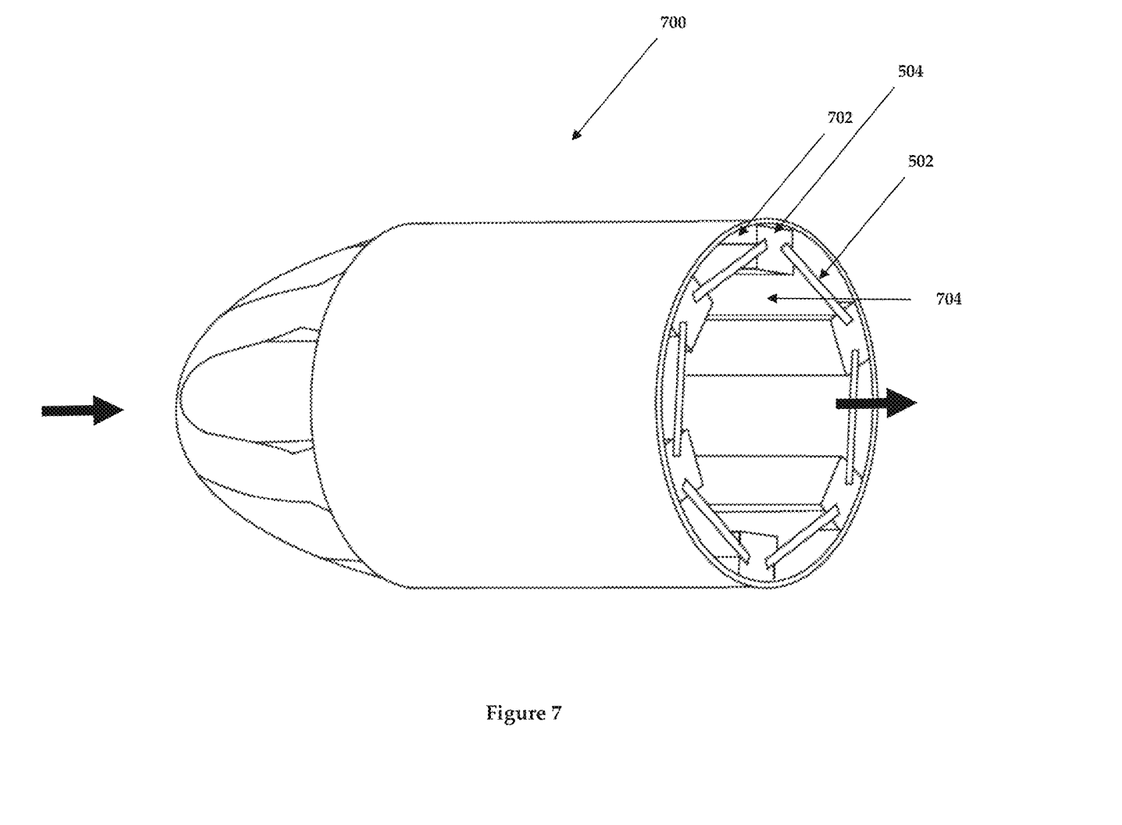
FIG. 7 is a back-perspective view of the shroud with internal channel showing the proposed configuration of a DPF, according to an exemplary embodiment of the invention.

The filter core is then 500 is housed within an assembly 600 comprised of a cylindrical housing 602 and a front nosecone 604. Unlike FIGS. 1-2, the nosecone 604 and housing 602 are not pneumatically porous, for the intent is for the exhaust gases to enter the assembly 600 through one or more scoops, duct or inlets 608. Note that the nosecone and housing may be made of ferrous or non-ferrous metals, as well as of other materials such as carbon composites, ceramics, etc., with the limitation that they are best when comprised of pneumatically non-porous materials, so that the majority (preferably totality) of the exhaust gases flow through the core 500.

Figure 8:
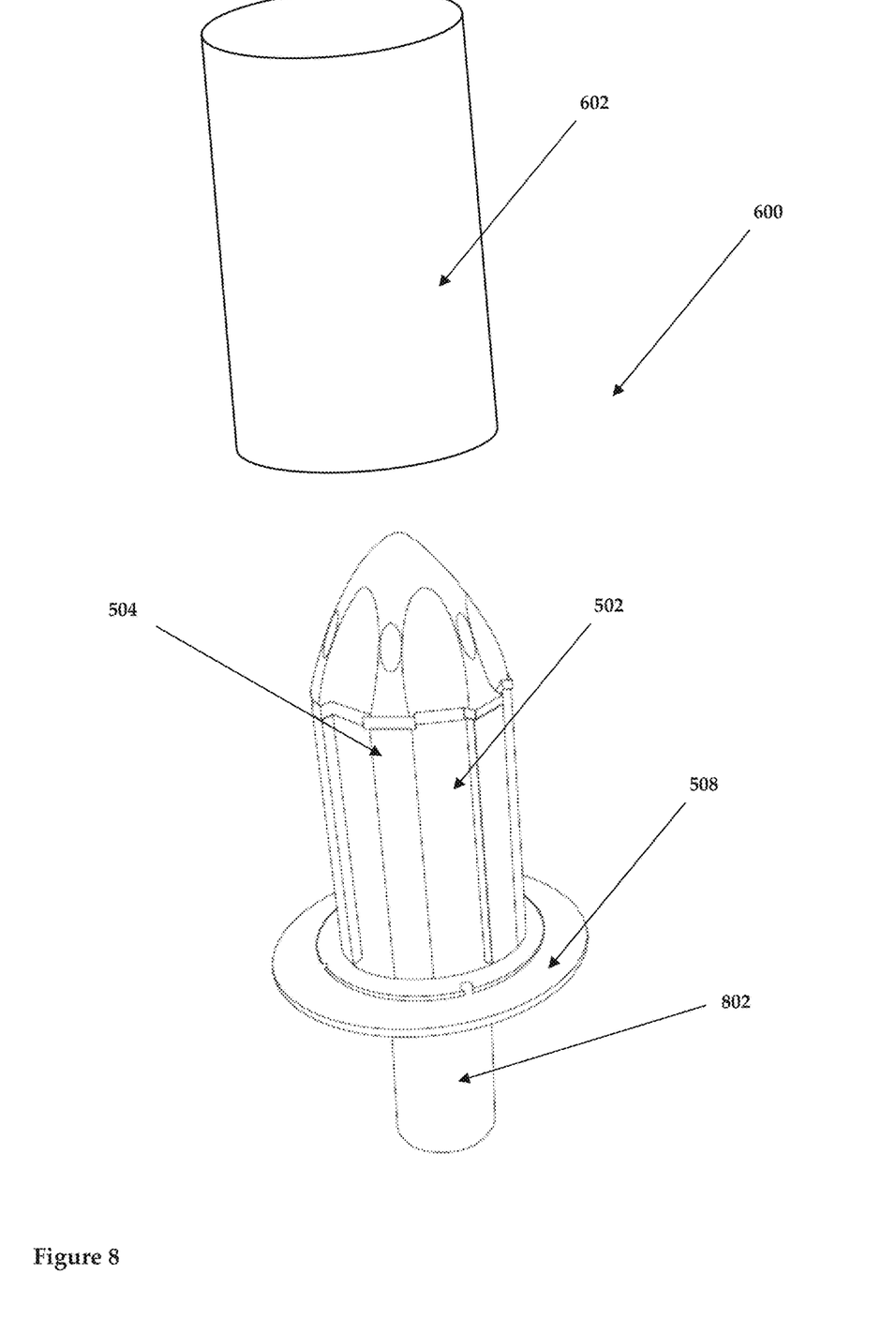
FIG. 8 shows a perspective view of the various components of the DPF before final assembly, according to an exemplary embodiment of the invention.
Figure 9:
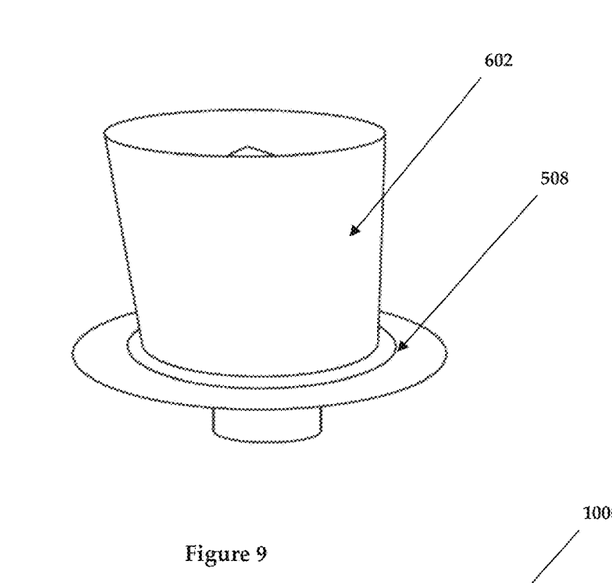
FIG. 9 is a perspective view of the DPF housing the filter components, according to an exemplary embodiment of the invention.
Figure 10:
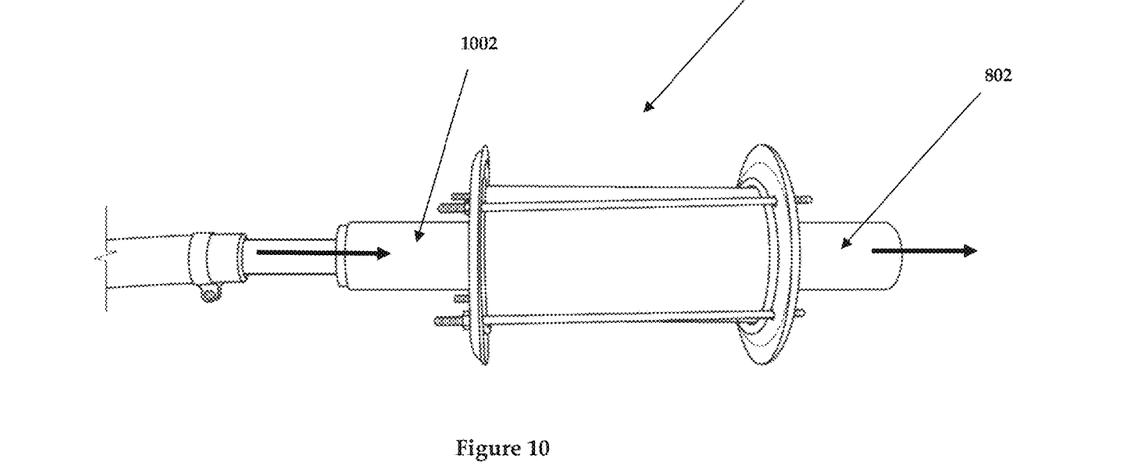
FIG. 10 is a perspective view of the complete DPF, according to an exemplary embodiment of the invention.

The above, force the exhaust gases into the interior of the assembly 600, where since the support plate 508 spans the diameter of the housing 602, they can only get through by passing from the upstream cavity 702 to the downstream 704 cavity. FIGS. 8-10 shows the assembly 600 mounted on the plate 508 (minus the cylindrical housing 602), with the downstream cavity 704 connected to the exhaust duct 802. FIG. 10 shows the complete assembly 1000, including the intake duct 1002.

In one embodiment, the unit operates with the assembly 1000 downstream from the engine exhaust. As the engine operates, the exhaust gases go through the filter material, and the soot accumulates on the upstream cavity 702 fascia of the filter plates 502, creating a pressure differential between the upstream cavity 702 and the downstream cavity 704. In a first embodiment, similar to that of disposable oil filters, the soot simply accumulates, and the complete filter assembly 500 or module 600 is replaced and disposed of either at a number of miles, or when the pressure differential exceeds a threshold over time.

In another embodiment, the heat brought by the exhaust gases raises the temperature of the filter plates 502, and the soot is burned off. Similarly, either at a regular interval and/or when the pressure differential is sensed to be above a threshold, the columns 504 may be artificially heated (either via built in resistors and/or convective transmission within metal to the columns from outside the module 600, say by heating the exhaust pipe or duct 802), which will result in the plates 502 heating enough to burn off the soot on the upstream cavity 702 fascia, clearing the pores 302 and resulting in improved gas flow.

In one embodiment, the carbon nature of the soot is used as a cleaning agent and electrical conductor across the plates 502. The columns 504 are made of non-conductive material such as ceramic where a high DC or AC potential may be applied across the plate 502 by means of porous electrodes such as a metallic net. When clean, no current would flow across the quartz/composite powder plate 502, however, the effective dielectric of the quartz/composite powder plate 502 varies as soot accumulates on the composite And eventually it reaches a point that triggers the discharge. The discharge stops once the soot is illuminated and filter is clean.

When sufficient soot particles have collected to form a soot cake within the fascia and body of a plate 502, the electrical transmissivity of the soot will reach a point where the soot 'completes the circuit', and a spark discharge occurs. The discharge passes through the soot cake and creates a localized temperature rise within the collected soot cake which burns it off. The discharge then stops until enough soot particles have again collected.

The above may be constantly charged (no sensing required), or be charged every so many starts of the engine, or miles driven, or refueling, or hours of operation, allowing for the regular cleaning of the filter plates 502 without additional pressure/condition sensors. The above collection of soot particles in the form of soot cake, and hence the sparks discharges to remove the soot, both occur throughout the entire thickness of the plates. Since the electrodes extend over the entire major surfaces of the plates, soot particles are effectively removed from the entire volume of the plates.

In one embodiment, the plates are provided on their upstream cavity 702 radially outer faces 506 with electrodes 1102/1104 (FIG. 11) of a first polarity and on the downstream cavity 704 inner faces 510 with electrodes of a second polarity. In one embodiment these electrodes are comprised of one or more electrically transmissive wires applied to the surface of the filter faces 506/510 or may be placed on the same faces 506/510 but formed of thin metal films deposited on the entire respective surfaces 506/510 of the filter plate 502 faces. The metal films may be Nickel or any other suitable ferrous or non-ferrous metal deposited.

Figure 11:
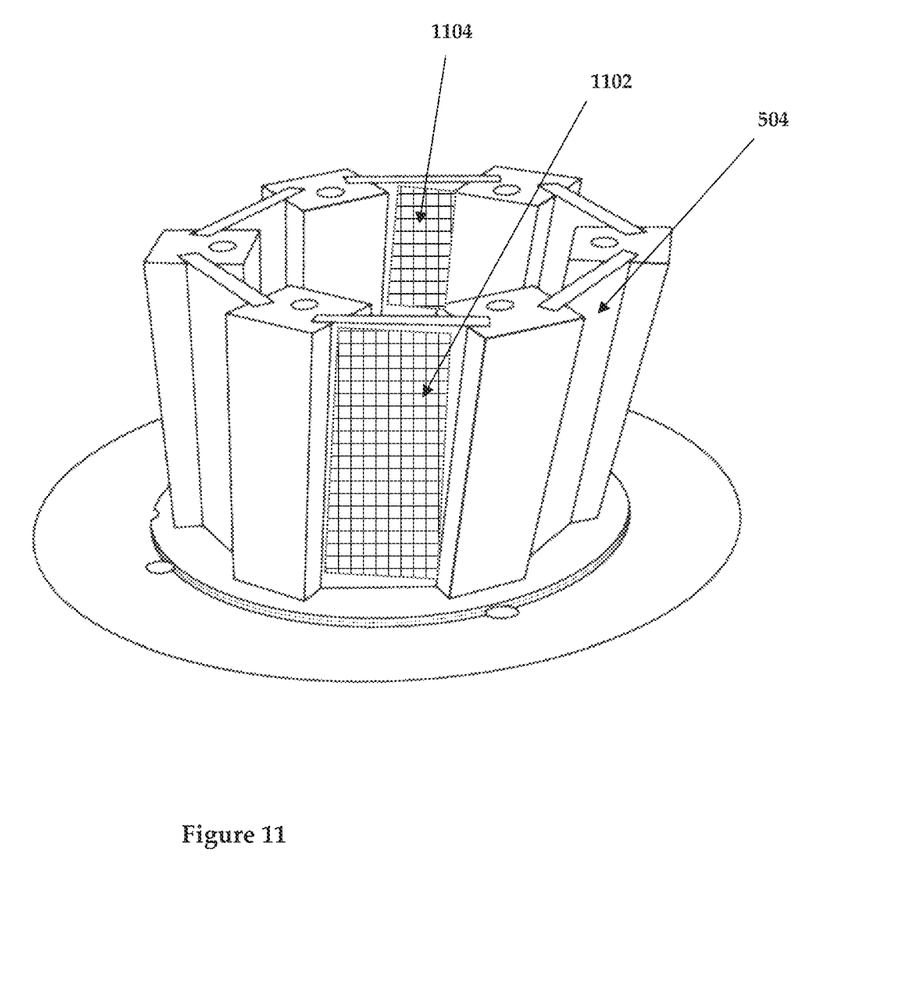
FIG. 11 is a perspective view of a DPF assembled from filter wafers with the metallic inserts over the filter fascia, according to an exemplary embodiment of the invention.

In one embodiment, the voltage is applied across the plate (from the front fascia 506 to the back 510), so that if the electrodes are connected to corresponding electrical terminals, and an AC or DC voltage applied, when there is enough soot material (carbon based) to complete the electrical path, the electrical discharge will burn off the soot. Depending on the orientation of the unit 1000, any soot ashes will collect either at the bottom of the unit or at the bottom of the case 602. When AC voltages are used, it may be possible to vary the frequency of the voltage depending on the material composition of the soot, so as to clean the plate 502 more efficiently.

The AC or DC potential may be applied continuously so that the occurrences of spark discharges are determined solely by the buildup of soot cake. Alternatively, the voltage may be pulsed, so that it is applied simultaneously to all plates 502 or sequentially to each individual plate 502. In another embodiment, the, the voltage may be applied intermittently at predetermined intervals. If the difference in pressure between the upstream 702 and downstream 704 portions is measure, the voltage may be applied once a certain threshold of pressure is reached.

CONCLUSION

In concluding the detailed description, it should be noted that it would be obvious to those skilled in the art that many variations and modifications can be made to the shown embodiments without substantially departing from the principles of the present invention. Also, such variations and modifications are intended to be included herein within the scope of the present invention as set forth in the appended claims. Further, in the claims hereafter, the structures, materials, acts and equivalents of all means or step-plus function elements are intended to include any structure, materials or acts for performing their cited functions.

It should be emphasized that the above-described embodiments of the present invention, particularly any "exemplary embodiments" are merely possible examples of the implementations, merely set forth for a clear understanding of the principles of the invention. Any variations and modifications may be made to the above-described embodiments of the invention without departing substantially from the spirit of the principles of the invention. All such modifications and variations are intended to be included herein within the scope of the disclosure and present invention and protected by the following claims.

The present invention has been described in sufficient detail with a certain degree of particularity. The utilities thereof are appreciated by those skilled in the art. It is understood to those skilled in the art that the present disclosure of embodiments has been made by way of examples only and that numerous changes in the arrangement and combination of parts may be resorted without departing from the spirit and scope of the invention as claimed. Accordingly, the scope of the present invention is defined by the appended claims rather than the foregoing description of embodiments.

The invention claimed is:

1. A Diesel Particulate Filter (DPF) assembly configured to be incorporated into an exhaust gas stream of a diesel engine, said DPF assembly comprising:
   one or more pneumatically porous ceramic filter panels;
   support mechanical components attached to said one or more panels so as to form a filter core; and
   a DPF assembly comprised of one or more housing mechanical components that create one or more upstream cavities and a downstream cavity pneumatically connected by said one or more porous ceramic filter panels, wherein:
   one or more of said filter panels are formed from a filter mix;
   said filter mix is comprised of the following percentage (by weight) ranges, which total 100%:
   55% to 65% mineral fibers comprised of one or more of:
      Quartz,
      or Alumina, and
   35% to 45% composite powder comprised of the following percentage (by weight) ranges, which total 100%:
      70% to 80% Silicon Oxide ($SiO_2$),
      4% to 6% Aluminum Oxide ($Al_2O_3$),
      14% to 18% Diboron Trioxide ($B_2O_3$), and
      2% to 4% Sodium Super Oxide ($NaO_2$).

2. The DPF assembly of claim 1 wherein:
   one or more of said filter panels has a mechanical support component configured to establish a voltage differential across said filter panel, said voltage differential being large enough to burn off a portion of soot captured within said panel.

3. The DPF assembly of claim 1 wherein:
   one or more said filter panels has had an electrically conductive electrode applied to all or part of an upstream filter panel fascia surface and a downstream filter panel fascia surface.

4. The DPF assembly of claim 3 wherein:
   said electrically conductive electrode is comprised of one or more of:

wires laid across all or part of said upstream filter panel fascia surface and said downstream filter panel fascia surface, or metal film deposited across all or part of said upstream filter panel fascia surface and said downstream filter panel fascia surface;

said composite powder is comprised of the following percentage (by weight):
75% Silicon Oxide ($SiO_2$),
5% Aluminum Oxide ($Al_2O_3$),
16% Diboron Trioxide ($B_2O_3$), and
3% Sodium Super Oxide ($NaO_2$); and said filter mix is comprised of the following percentage (by weight):
60% mineral fibers, and
40% composite powder.

5. The DPF assembly of claim 4 wherein:
one or more of said panels have been treated with Ceria (Cerium Dioxide $CeO_2$).

6. The DPF assembly of claim 1 wherein:
one or more of said filter panels has a mechanical support component configured to establish a voltage differential across an upstream fascia surface of said filter panel, said voltage differential being large enough to burn off a portion of soot captured within said panel.

7. The DPF assembly of claim 6 wherein:
one or more said filter panels has had an electrically conductive electrode applied to all or part of the upstream fascia surface and a downstream filter fascia surface.

8. The DPF assembly of claim 7 wherein:
said electrically conductive electrode is comprised of one or more of:
wires laid across said filter fascia surface, or
metal film deposited across said filter fascia surface;

said composite powder is comprised of the following percentage (by weight):
75% Silicon Oxide ($SiO_2$),
5% Aluminum Oxide ($Al_2O_3$),
16% Diboron Trioxide ($B_2O_3$), and
3% Sodium Super Oxide ($NaO_2$); and said filter mix is comprised of the following percentage (by weight):
60% mineral fibers, and
40% composite powder.

9. The DPF assembly of claim 8 wherein:
one or more of said panels have been treated with Ceria (Cerium Dioxide $CeO_2$).

10. The DPF assembly of claim 1 wherein:
said filter panels are enclosed within a chamber configured to accept microwave energy, said energy being significantly large enough to burn off a portion of soot captured within one or more of said panels.

11. The DPF assembly of claim 10 wherein:
said composite powder is comprised of the following percentage (by weight):
75% Silicon Oxide ($SiO_2$),
5% Aluminum Oxide ($Al_2O_3$),
16% Diboron Trioxide ($B_2O_3$), and
3% Sodium Super Oxide ($NaO_2$); and said filter mix is comprised of the following percentage (by weight):
60% mineral fibers, and
40% composite powder.

12. The DPF assembly of claim 11 wherein:
one or more of said panels have been treated with Ceria (Cerium Dioxide $CeO_2$).

13. A method for creating filter panels for a Diesel Particulate Filter (DPF) assembly, said method comprising:
crushing mineral fibers;
creating a composite powder comprised of Silicon Oxide ($SiO_2$), Aluminum Oxide ($Al_2O_3$), Diboron Trioxide ($B_2O_3$) and Sodium Super Oxide ($NaO_2$);
creating a filter mix by mixing said mineral fibers with said composite powder;
placing said filter mix in a mold and sintering said filter mix for at least 30 minutes at a temperature of at least 1200° C.;
gradually lowering the filter mix temperature to 700° C. during at least 10 minutes; and
allowing the molded filter mix to cool to ambient temperature.

14. The method claim 13 wherein:
said mineral fibers are comprised or one or more of:
Quartz, or
Alumina.

15. The method of claim 14 wherein:
said composite powder is comprised of the following percentage (by weight) ranges, which total 100%:
70% to 80% Silicon Oxide ($SiO_2$),
4% to 6% Aluminum Oxide ($Al_2O_3$),
14% to 18% Diboron Trioxide ($B_2O_3$), and
2% to 4% Sodium Super Oxide ($NaO_2$); and said filter mix is comprised of the following percentage (by weight) ranges, which total 100%:
55% to 65% mineral fibers, and
35% to 45% composite powder.

16. The method of claim 15 wherein:
said composite powder is comprised of the following percentage (by weight):
75% Silicon Oxide ($SiO_2$),
5% Aluminum Oxide ($Al_2O_3$),
16% Diboron Trioxide ($B_2O_3$), and
3% Sodium Super Oxide ($NaO_2$); and said filter mix is comprised of the following percentage (by weight):
60% mineral fibers, and
40% composite powder.

17. The method of claim 16 wherein:
said filter panel is removed from said mold and immersed in a Ceria (Cerium Dioxide $CeO_2$) solution for at least 10 minutes; and
said Ceria treated panel is sintered at a low temperature for at least 10 minutes.

18. The method of claim 17 wherein:
one or more fascia of said filter panel have a nickel film deposited on their entire surface.

* * * * *